United States Patent
Yoshimoto et al.

(10) Patent No.: US 11,189,399 B2
(45) Date of Patent: Nov. 30, 2021

(54) PASTE CONTAINING POLYTETRAFLUOROETHYLENE AND METHOD FOR PRODUCING SAME

(71) Applicant: DAIKIN INDUSTRIES, LTD., Osaka (JP)

(72) Inventors: Hiroyuki Yoshimoto, Osaka (JP); Kohei Yasuda, Osaka (JP); Kazuya Kawahara, Osaka (JP); Haruhisa Masuda, Osaka (JP); Masayuki Tsuji, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 276 days.

(21) Appl. No.: 15/121,150

(22) PCT Filed: Feb. 27, 2015

(86) PCT No.: PCT/JP2015/055838
§ 371 (c)(1),
(2) Date: Aug. 24, 2016

(87) PCT Pub. No.: WO2015/129855
PCT Pub. Date: Sep. 3, 2015

(65) Prior Publication Data
US 2016/0372240 A1    Dec. 22, 2016

(30) Foreign Application Priority Data

Feb. 27, 2014   (JP) .............................. JP2014-037527

(51) Int. Cl.
| | | |
|---|---|---|
| *C08J 3/05* | (2006.01) | |
| *H01B 13/14* | (2006.01) | |
| *H01B 3/44* | (2006.01) | |
| *C08J 3/11* | (2006.01) | |
| *C08F 14/26* | (2006.01) | |
| *C09D 127/18* | (2006.01) | |
| *H01B 7/02* | (2006.01) | |

(52) U.S. Cl.
CPC .......... *H01B 13/148* (2013.01); *C08F 14/26* (2013.01); *C08J 3/05* (2013.01); *C08J 3/11* (2013.01); *C09D 127/18* (2013.01); *H01B 3/445* (2013.01); *H01B 7/0275* (2013.01); *C08J 2327/18* (2013.01)

(58) Field of Classification Search
CPC .... H01B 13/148; H01B 7/0275; H01B 3/445; C08J 3/11; C08F 14/26; C09D 127/18
See application file for complete search history.

(56) References Cited

U.S. PATENT DOCUMENTS

| 2,593,582 A | * | 4/1952 | Lontz | ............... | C08K 5/01 |
| | | | | | 524/474 |
| 2005/0271940 A1 | * | 12/2005 | Fukunaga | ............... | H01M 4/04 |
| | | | | | 429/217 |
| 2008/0020159 A1 | * | 1/2008 | Taira | ............... | C08F 214/26 |
| | | | | | 428/35.7 |
| 2008/0281067 A1 | * | 11/2008 | Nanba | ............... | C08F 14/26 |
| | | | | | 526/255 |
| 2013/0184401 A1 | * | 7/2013 | Miyamoto | ............... | C08J 3/16 |
| | | | | | 524/546 |

FOREIGN PATENT DOCUMENTS

| EP | 0 798 333 A1 | 10/1997 |
| EP | 798333 A1 * | 10/1997 |
| WO | 1995/023178 A1 | 8/1995 |
| WO | 2008/102878 A1 | 8/2008 |
| WO | WO-2008/102878 A1 * | 8/2008 |

OTHER PUBLICATIONS

International Search Report of PCT/JP2015/055838 dated May 26, 2015.
International Preliminary Report on Patentability issued from the International Bureau in counterpart International application No. PCT/JP2015/055838, dated Aug. 30, 2016.

* cited by examiner

*Primary Examiner* — Peter D. Mulcahy
(74) *Attorney, Agent, or Firm* — Sughrue Mion, PLLC

(57) ABSTRACT

The present invention aims to provide a paste containing polytetrafluoroethylene which can be formed into a molded polytetrafluoroethylene article having a significantly small thickness of polytetrafluoroethylene and is less likely to cause defects in molding; and a method of producing the paste. The present invention provides a method of producing a paste, including the steps of coagulating primary particles of polytetrafluoroethylene in an aqueous dispersion that contains the primary particles and water to form slurry that contains secondary particles of polytetrafluoroethylene and water or secondary particles of polytetrafluoroethylene floating in water; and adding an organic solvent to at least one of the slurry and the secondary particles of polytetrafluoroethylene floating in water to provide the paste.

10 Claims, No Drawings

PASTE CONTAINING POLYTETRAFLUOROETHYLENE AND METHOD FOR PRODUCING SAME

CROSS REFERENCE TO RELATED APPLICATIONS

This application is a National Stage of International Application No. PCT/JP2015/055838 filed Feb. 27, 2015, claiming priority based on Japanese Patent Application No. 2014-037527, filed Feb. 27, 2014, the contents of all of which are incorporated herein by reference in their entirety.

TECHNICAL FIELD

The present invention relates to a paste containing polytetrafluoroethylene for forming molded articles by extrusion molding, and a method of producing the paste.

BACKGROUND ART

Polytetrafluoroethylene (PTFE), having excellent properties, has been used for various applications. Along with the recent progress of the technologies, products such as information-communication devices, medical devices, and automobile parts have been downsized. This accompanies strong demands for minute or thin articles made of PTFE, such as electric wires, cables, tubes, and filters.

When molded into articles such as electric wires, cables, tubes, and filters, PTFE is first made into a form of molding powder, fine powder, or pellet before molding. This is because PTFE primary particles, which have small diameters and thus are difficult to handle, need to be made into secondary particles for producing molded articles. When such materials for molding are subjected to extrusion molding, the extrusion pressure at a reduction ratio of 22000 is unfortunately as extremely high as not lower than 100 MPa. Thus, molded articles produced by extrusion molding have a thickness of about 100 μm as a lower limit. When an article having a thickness smaller than the limit is produced, it fails to have a uniform thickness. Besides, conventional techniques cannot provide PTFE primary particles in a dry state. Primary particles thus cannot be used for preforming.

As a measure for these problems, Patent Literature 1 proposes a method of producing a PTFE molded article, including extrusion molding of a dispersion of PTFE primary particles.

CITATION LIST

Patent Literature

Patent Literature 1: WO 2008/102878

SUMMARY OF INVENTION

Technical Problem

The production method disclosed in Patent Literature 1 succeeds in achieving a low extrusion pressure to provide PTFE molded articles with a significantly small thickness. This method, however, tends to cause defects in molding and has difficulty in stable molding.

In view of these circumstances, the present invention aims to provide a paste containing PTFE that can be molded into a PTFE article having a significantly small PTFE thickness and is less likely to cause defects in molding; and a method of producing the paste.

Solution to Problem

Production of polytetrafluoroethylene (PTFE) through emulsion polymerization gives PTFE in a form of primary particles dispersed in an aqueous dispersion. The primary particles are coagulated and then dried so that the primary particles aggregate into secondary particles (fine powder). Then, an extrusion aid is added to the recovered secondary particles. The resulting mixture is formed into an article by extrusion molding.

The inventors found that the above problems can be solved by a paste produced by the following method, unlike a paste produced by the above conventional method. In this method, PTFE secondary particles prepared through coagulation are not dried and the water in the paste is thus not volatilized. Then, an organic solvent is added to the secondary particles containing water (referred to as slurry herein) to provide a paste. The inventors also found that this paste has a specific physical property that is a key for solving the above problems. The physical property can be characterized by a ratio A/B of not lower than 5, wherein B is an extrusion pressure at a reduction ratio of 2500 of the above prepared paste, and A is an extrusion pressure at a reduction ratio of 2500 of a paste that is obtained by sintering the above prepared paste at 250° C. for five hours to provide dry particles and adding the same organic solvent as contained in the pre-sintered paste in the same mass as contained in the pre-sintered paste to the dry particles.

In other words, the present invention provides a method of producing a paste, including the steps of: coagulating primary particles of polytetrafluoroethylene in an aqueous dispersion that contains the primary particles and water to form slurry that contains secondary particles of polytetrafluoroethylene and water or secondary particles of polytetrafluoroethylene floating in water; and adding an organic solvent to at least one of the slurry and the secondary particles of polytetrafluoroethylene floating in water to provide the paste.

The slurry preferably contains not less than 60% by mass of water relative to the secondary particles.

Preferably, 14% to 35% by mass of the organic solvent is added relative to the secondary particles of polytetrafluoroethylene.

The paste preferably contains 14% to 35% by mass of the organic solvent relative to the secondary particles of polytetrafluoroethylene.

The paste preferably contains 5% to 50% by mass of water relative to the secondary particles of polytetrafluoroethylene.

The production method preferably further includes the step of heating the paste to a temperature higher than the boiling point of water but lower than the boiling point of the organic solvent. The organic solvent preferably has a boiling point higher than the boiling point of water.

The paste preferably contains not more than 2.0% by mass of water relative to the secondary particles of polytetrafluoroethylene.

The present invention also provides a paste (A) containing secondary particles of polytetrafluoroethylene and an organic solvent, the paste (A) satisfying a ratio A/B of not lower than 5, wherein A is an extrusion pressure of a paste (B) at a reduction ratio of 2500 and B is an extrusion pressure of the paste (A) at a reduction ratio of 2500, the paste (B) being obtained by sintering the paste (A) at 250° C. for five hours to provide dry particles and adding the same organic solvent as contained in the pre-sintered paste (A) in the same mass as contained in the paste (A) to the dry particles.

The present invention also provides a coated electric wire including a core wire, and a coating layer covering the core wire, the coating layer being obtainable by extrusion molding of the above paste.

The present invention also provides a tube obtainable by extrusion molding of the above paste.

Advantageous Effects of Invention

Extrusion molding of the paste of the present invention readily provides a molded article with a small thickness and is less likely to cause defects in molding. The paste can be produced by the production method of the present invention.

DESCRIPTION OF EMBODIMENTS

The present invention is specifically described below.

The paste of the present invention contains secondary particles of polytetrafluoroethylene (PTFE) and an organic solvent.

The PTFE may be homo-PTFE or modified PTFE. The modified PTFE contains a TFE unit and a modifying monomer unit based on a modifying monomer copolymerizable with TFE.

Preferably, the PTFE has non-melt-fabricability and fibrillatability.

The modifying monomer may be any modifying monomer copolymerizable with TFE. Examples thereof include perfluoroolefins such as hexafluoropropylene (HFP); chlorofluoroolefins such as chlorotrifluoroethylene (CTFE); hydrogen-containing fluoroolefins such as trifluoroethylene and vinylidene fluoride (VDF); perfluorovinyl ethers; perfluoroalkyl ethylenes; ethylene; and fluorine-containing vinyl ethers that contain a nitrile group. One or more of these modifying monomers may be used.

The perfluorovinyl ether is not particularly limited and examples thereof include a perfluoro unsaturated compound represented by the formula (1):

$$CF_2=CF-ORf^1 \quad (1)$$

(wherein $Rf^1$ is a perfluoro organic group). The term "perfluoro organic group" herein means an organic group in which the hydrogen atoms bonded to a carbon atom are all substituted with fluorine atoms. The perfluoro organic group may contain ether oxygen.

Examples of the perfluorovinyl ether include perfluoro (alkyl vinyl ether) (PAVE) represented by the formula (1) in which $Rf^1$ is a C1-C10 perfluoroalkyl group. The carbon number of the perfluoroalkyl group is preferably 1 to 5.

Examples of the perfluoroalkyl group of PAVE include a perfluoromethyl group, a perfluoroethyl group, a perfluoropropyl group, a perfluorobutyl group, a perfluoropentyl group, and a perfluorohexyl group. Preferred is a perfluoropropyl vinyl ether (PPVE) in which the perfluoroalkyl group is a perfluoropropyl group.

Examples of the perfluorovinyl ether further include ones in which $Rf^1$ is a C4-C9 perfluoro(alkoxy alkyl) group in the formula (1), ones in which $Rf^1$ is represented by the following formula:

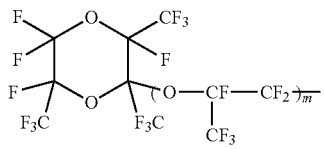

(wherein m is 0 or an integer of 1 to 4), and ones in which $Rf^1$ is represented by the formula:

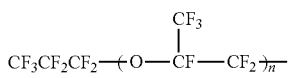

(wherein n is an integer of 1 to 4).

The perfluoroalkyl ethylene is not particularly limited, and examples thereof include perfluorobutyl ethylene (PFBE) and perfluorohexyl ethylene (PFHE).

The fluorine-containing vinyl ether that contains a nitrile group is more preferably a fluorine-containing vinyl ether represented by the formula: $CF_2=CFORf^2CN$ (wherein $Rf^2$ is a C2-C7 alkylene group in which an oxygen atom may be inserted between two carbon atoms).

The modifying monomer for the modified PTFE is preferably at least one selected from the group consisting of HFP, CTFE, VDF, PPVE, PFBE, and ethylene. The modifying monomer is more preferably at least one monomer selected from the group consisting of HFP and CTFE.

The modified PTFE contains a modifying monomer unit in an amount of preferably 0.001 to 2 mol %, more preferably 0.001 to less than 1 mol %.

The amount of each monomer constituting PTFE herein may be calculated by appropriately combining NMR, FT-IR, elemental analysis, and fluorescent X-ray analysis depending on the kind of the monomer.

The PTFE has a melting point of preferably 324° C. to 360° C. The melting point is a temperature corresponding to a maximum value on a heat of fusion curve obtained by heating the PTFE at 10° C./min using a differential scanning calorimeter (DSC).

The PTFE has a standard specific gravity (SSG) of preferably not higher than 2.20 in terms of mechanical strength of the resulting molded articles. The lower limit of the SSG is preferably 2.12, more preferably 2.15. The upper limit thereof is more preferably 2.19 in terms of moldability. The SSG is measured by the water displacement method in conformity with ASTM D-792 using a sample molded in conformity with ASTM D-4895 98.

The paste of the present invention may contain a resin other than PTFE. Examples of the resin other than PTFE include a TFE/HFP copolymer (FEP), a TFE/perfluoro (alkyl vinyl ether) (PAVE) copolymer (PFA), an ethylene/TFE copolymer (ETFE), polyvinylidene fluoride (PVdF), polychlorotrifluoroethylene (PCTFE), polypropylene, and polyethylene.

The PAVE is preferably perfluoro(methyl vinyl ether) (PMVE), perfluoro (ethyl vinyl ether) (PEVE), perfluoro (propyl vinyl ether) (PPVE), or perfluoro(butyl vinyl ether), and is more preferably PPVE, in terms of thermal stability. One or two or more of the above PAVE units may be contained.

When the paste of the present invention contains the resin other than PTFE, the amount of the PTFE is preferably not less than 40% by mass but less than 100% by mass and the amount of the resin other than PTFE is preferably more than 0% by mass but less than 60% by mass. The PTFE in an amount of less than 40% by mass may cause the resulting PTFE molded articles to have deteriorated heat resistance, chemical resistance, weather resistance, non-adhesiveness, electrical insulation, flame retardance, and mechanical strength. The mixture more preferably contains 70% by mass or more of the PTFE but less than 30% by mass of the resin other than PTFE.

The resin other than PTFE is preferably a melt-fabricable fluororesin in order to improve the heat resistance of the resulting PTFE molded articles and enable stable use thereof at relatively high temperatures. Examples of the melt-fabricable fluororesin include FEP, PFA, PVdF, ETFE, and EFEP, and preferred among these are FEP and PFA. Examples of the PFA include a TFE/PMVE copolymer and a TFE/PPVE copolymer.

The above mixture may be prepared by adding powder of the resin other than PTFE to a dispersion of PTFE primary particles or by adding a dispersion of the resin other than PTFE to the dispersion of PTFE primary particles.

The paste of the present invention is a paste (A) containing secondary particles of polytetrafluoroethylene and an organic solvent, the paste (A) satisfying a ratio A/B of not lower than 5, wherein A is an extrusion pressure of a paste (B) at a reduction ratio of 2500 and B is an extrusion pressure of the paste (A) at a reduction ratio of 2500. The paste (B) is obtained by sintering the paste (A) at 250° C. for five hours to provide dry particles and adding the same organic solvent as contained in the pre-sintered paste (A) in the same mass as contained in the paste (A) to the dry particles.

Pastes that require a high pressure in extrusion molding among conventionally known pastes make it impossible to determine not only the extrusion pressure A but also the extrusion pressure B at a reduction ratio of 2500. Such pastes are herein regarded as having a ratio A/B of less than 5.

The paste (A) of the present invention is suitably used for paste extrusion molding. The paste extrusion molding means a molding method in which an object to be extruded is loaded in a cylinder with a cross-sectional shape such as a circle or a square and the object is extruded through a die with a smaller area than the cross-sectional area of the cylinder with a mechanical means such as a ram or a piston with a pressure greater than ordinary pressure (normal pressure) to provide a molded article.

A PTFE molded article called a thin article or a slender article is usually produced by paste extrusion molding using a material for molding in a form called fine powder. The fine powder used in conventional molding is produced by coagulating and drying aqueous dispersion prepared through emulsion polymerization. Such fine powder mainly contains about 400- to 500-μm diameter secondary particles that are aggregates of primary particles formed through polymerization. When the fine powder is used for paste extrusion molding, the extrusion pressure at a reduction ratio of 22000 is as extremely high as not lower than 100 MPa. Accordingly, a molded article formed from the fine powder can only have a thickness of 100 μm as a lower limit. Such fine powder fails to provide a uniform coating or tube with a thickness smaller than the limit.

Meanwhile, when a dispersion of PTFE primary particles is subjected to extrusion molding in conformity with the production method described in WO 2008/102878, the extrusion pressure during extrusion molding can be significantly low to allow production of a molded article with a PTFE thickness of not greater than 50 μm, which cannot be accomplished by conventional techniques.

When such a dispersion formed without coagulation is used as a material for molding, however, the extrusion pressure becomes too low. When such a dispersion is formed into an electric wire or a tube by continuous extrusion molding, the material for molding is not smoothly extruded from the die of an extruder. This causes defects in coating or uneven thickness of the resulting article.

The paste (A) of the present invention having the aforementioned properties achieves unexpected effects: the paste can be formed into a PTFE molded article having a significantly small PTFE thickness and is less likely to cause defects in molding even when formed into a thin molded article. The paste (A) of the present invention is obtained by coagulating an aqueous dispersion prepared through emulsion polymerization and adding an organic solvent to the dispersion without a drying step in the production process described below. Skipping a drying step presumably enables formation of secondary particles that include more weakly bonded primary particles than a fine polymer formed through an ordinary drying step. Accordingly, the organic solvent presumably permeates between the primary particles to reduce the extrusion pressure. In fact, the paste (A) of the present invention has an extrusion pressure at a reduction ratio of 2500 of as low as 2 to 20 MPa. Presumably, when such a paste containing secondary particles that include weakly bonded primary particles is sintered at 250° C. for five hours, the organic solvent between the primary particles volatilizes to fasten the bonds between the primary particles. As a result, the sintered paste (B) has an extrusion pressure at a reduction ratio of 2500 of 10 to 100 MPa, which is five times or more of the extrusion pressure of the pre-sintered paste (A).

The above presumptions are made on the basis of the following fact. When the above experiment is carried out for a paste in which an organic solvent is added to a fine powder formed through a conventional drying step, the extrusion pressure at a reduction ratio of 200 of the paste after drying at 250° C. for five hours is about 0.7 to about 1.5 times of the extrusion pressure of the pre-sintered paste.

The paste (A) of the present invention has an extrusion pressure at a reduction ratio of 2500 of preferably not higher than 60 MPa, more preferably not higher than 40 MPa. The lower limit thereof is preferably 10 MPa, more preferably 12 MPa. Too low an extrusion pressure possibly makes it difficult to achieve stable molding.

In PTFE paste extrusion, an extrusion pressure of 10 MPa to 60 MPa leads to formation of an appropriate extrudate.

The extrusion pressure may be adjusted to 10 to 60 MPa by changing the amount of the organic solvent in the range of 14% to 35% by weight relative to the PTFE secondary particles, depending on extrusion conditions such as a reduction ratio.

The paste (A) of the present invention preferably has an extrusion pressure at a reduction ratio of 22000 of 10 to 60 MPa and contains PTFE secondary particles. Such a paste enables stable, continuous production of slender electric wires and slender tubes.

PTFE secondary particles have an average particle size of preferably not smaller than 50 μm, more preferably not smaller than 100 μm, while preferably not greater than 2 mm, more preferably not greater than 1 mm. The average particle size may be measured with a device such as an optical microscope or a microscope available from Keyence Corporation.

The paste of the present invention contains PTFE secondary particles in an amount of preferably not less than 65% by mass, more preferably not less than 70% by mass, while preferably not more than 86% by mass, more preferably not more than 83% by mass. Too large an amount of PTFE secondary particles may make it difficult to achieve stable molding. Too small an amount of PTFE secondary particles may increase the extrusion pressure and thus may fail to provide molded articles with more sufficient mechanical strength.

The amount of PTFE secondary particles denotes the solid concentration of the secondary particles in the paste and is determined as follows. A paste as a sample is heated at 10° C./min up to 100° C. with a thermogravimetry and differential thermal analysis (TG-DTA) device, followed by maintaining the temperature for 30 minutes. The temperature of the sample is then further raised at 10° C./min up to 180° C., followed by maintaining the temperature for 30 minutes. The residue is determined as the PTFE amount.

Examples of the organic solvent include hydrocarbon solvents such as solvent naphtha, white oil, isoparaffinic solvents, and naphthenic solvents; ketone solvents such as acetone and methyl ethyl ketone; alcohol solvents such as methyl alcohol, ethyl alcohol, isopropyl alcohol, ethylene glycol, and glycerin; and ether solvents such as ethylene glycol monobutyl ether. Solvents that do not dissolve in water are preferred, and hydrocarbon solvents are more preferred.

The organic solvent is preferably one that has a boiling point higher than water, more preferably one that has an initial boiling point of not lower than 110° C., still more preferably one that has an initial boiling point of not lower than 130° C., further preferably one that has an initial boiling point of not lower than 110° C. but lower than 327° C. and has an surface energy of not less than 14 mN/m but less than 30 mN/m. An organic solvent having a boiling point higher than water enables easy production of a paste containing a minimum amount of water. The surface energy of the organic solvent may be determined by the surface tension measurement method with a du nouy tensiometer in conformity with JIS K2241.

In particular, the organic solvent is preferably at least one selected from the group consisting of solvent naphtha, white oil, naphthenic hydrocarbons, and isoparaffinic hydrocarbons.

Specific examples of the organic solvent include hydrocarbon solvents (e.g., naphthenic hydrocarbon, isoparaffinic hydrocarbon) that have a surface energy of not lower than 14 mN/m but lower than 30 mN/m and a carbon number of not more than 20, and halides thereof and cyanides thereof; C1-C15 esters, C1-C15 phosphate esters, C1-C15 nitrate esters, C1-C15 nitrite esters, C1-C15 carbonate esters, and halides thereof; C1-C10 alcohol solvents, C1-C10 ketone solvents, C1-C10 aldehyde solvents, and halides thereof; C1-C10 carboxylic acids, C1-C10 amines, and C1-C10 thiols; silicides (e.g., hexamethyldisiloxane, trichlorosilane, triethylsilane, silicone oil); organosulfur compounds (e.g., dimethyl sulfide, diethyl sulfide, dipropyl sulfide, dibutyl sulfide); and mixtures thereof.

The paste of the present invention contains the organic solvent in an amount of preferably 14% to 35% by mass relative to PTFE secondary particles. The amount of the organic solvent is more preferably not less than 19% by mass and not more than 30% by mass. Too small an amount of the organic solvent may make it difficult to achieve stable molding. Too large an amount of the organic solvent may fail to provide molded articles with sufficient mechanical strength.

The amount of the organic solvent to be contained is 14% to 35% by mass. A larger amount thereof gives a lower extrusion pressure. Accordingly, the extrusion pressure may be appropriately adjusted by controlling the amount of the organic solvent together with extrusion conditions such as a reduction ratio. The extrusion pressure may be adjusted not only by the amount of the organic solvent added to slurry or added after coagulation but also by the extent of drying during or after water evaporation or by the temperature or time for heat treatment. Heat treatment at a temperature around or higher than the initial boiling point of the organic solvent transpires part of the organic solvent to adjust the extrusion pressure higher.

The paste of the present invention preferably further contains water, more preferably contains 5% to 50% by mass of water relative to the PTFE secondary particles. The amount of water is still more preferably not less than 10% by mass and not more than 40% by mass.

A paste that contains water in addition to the PTFE secondary particles and the organic solvent is advantageous because such a paste can be comparatively easily produced through emulsion polymerization.

The paste of the present invention also preferably contains a minimum amount of water, more preferably contains as little as not more than 2.0% by mass of water relative to the PTFE secondary particles. The amount of water is still more preferably not more than 1.0% by mass, particularly preferably not more than 0.5% by mass, while the lower limit thereof is 0% by mass though it is not particularly limited. A paste that hardly contains water is disadvantageous in that the paste needs to be produced through a slightly complex process, but is advantageous in that stable molding can be achieved. In the case of a paste containing a large amount of water, only water may be extruded in extrusion, which instantaneously reduces the extrusion pressure, resulting in a shredded extrudate lacking uniformity.

The paste of the present invention may contain additives such as a surfactant, an antioxidant, a light stabilizer, a fluorescent whitening agent, a colorant, a pigment, a dye, and a filler. The paste of the present invention may contain, for example, powder or fiber powder of carbon black, graphite, alumina, mica, silicon carbide, boron nitride, titanium oxide, bismuth oxide, bronze, gold, silver, copper, nickel, or the like. The paste may contain fine particles of a polymer other than the aforementioned resins or other components within the range that does not impair the aims of the present invention.

The paste of the present invention may be appropriately produced by the production method of the present invention described below.

The production method of the present invention includes the steps of coagulating PTFE primary particles in an aqueous dispersion that contains the primary particles and water to form slurry that contains PTFE secondary particles and water or PTFE secondary particles floating in water; and adding an organic solvent to at least one of the slurry and the PTFE secondary particles floating in water to provide the paste.

The production method of the present invention may include preparing an aqueous dispersion that contains PTFE primary particles and water.

The aqueous dispersion that contains PTFE primary particles and water may be prepared through emulsion polymerization. More specifically, the aqueous dispersion may be prepared by polymerizing TFE in an aqueous medium in the presence of a fluorine-containing surfactant and a polymerization initiator. If needed, TFE may be polymerized with the aforementioned modifying monomer.

The aqueous dispersion prepared through emulsion polymerization usually contains PTFE primary particles having an average primary particle size of 100 to 500 nm. The average primary particle size is calculated as follows. The aqueous dispersion of PTFE with the solid concentration adjusted to 0.15% by mass is placed in a cell. Light with a wavelength of 550 nm is applied thereto and the transmittance is determined. Meanwhile, the number average primary particle size of the primary particles is calculated from the Feret diameters measured from a transmission electron micrograph. A calibration curve is plotted from the obtained transmittance and the number average primary particle size. The average primary particle size is then determined from the calibration curve and the transmittance of each sample.

The aqueous dispersion usually has a solid concentration of 1% to 40% by mass or 20% to 30% by mass. The solid concentration is determined as follows. The aqueous dispersion in an amount of 1 g is dried at 150° C. for 60 minutes in an air dryer. The ratio of the mass of the residue after heating to the mass (1 g) of the aqueous dispersion is expressed in a percentage as a solid concentration.

In order to enhance the stability and the storage stability of the aqueous dispersion, a surfactant may be added to the aqueous dispersion in an amount of 0.5% to 10% by mass relative to the solid weight of PTFE.

The aqueous dispersion may be condensed to have a solid concentration of 40% to 70% by mass.

After preparation of the aqueous dispersion, PTFE primary particles in the aqueous dispersion are coagulated. Coagulation may be carried out by a conventionally known method. For example, primary particles may be strongly agitated to coagulate, an acid or a salt may be added to the primary particles and the mixture is agitated to coagulate, or an organic solvent such as methanol or acetone may be added to the primary particles and the mixture is agitated to coagulate. Coagulation of PTFE primary particles causes generation of secondary particles, resulting in formation of slurry that contains PTFE secondary particles and water.

As coagulation proceeds, the generated PTFE secondary particles float in water. The formed slurry may be condensed or diluted in the below mentioned step before addition of an organic solvent. However, such operation may be skipped unless there is a special reason because PTFE secondary particles generated through coagulation are naturally separated from the aqueous phase to float, which enables easy recovering. Thus, the slurry may contain the water used in emulsion polymerization usually in an amount of more than 20% by mass or 60% by mass or more relative to the secondary particles. The water may contain a surfactant and residual additives from polymerization. In order to remove these impurities, floating PTFE secondary particles may be separated through a tool such as a metal mesh, followed by at least one washing with fresh water.

The slurry contains preferably not less than 60% by mass of water relative to the secondary particles for easy production.

Subsequently, the aforementioned organic solvent is added to the slurry to produce the paste of the present invention. The organic solvent may be added to the slurry under agitation.

The timing for addition of the organic solvent may be either after formation of slurry or after floating of PTFE secondary particles in water.

The amount of the organic solvent to be added is preferably 14% to 35% by mass relative to the PTFE secondary particles. The amount of the organic solvent to be added is more preferably not less than 19% by mass and not more than 30% by mass. The amount of the organic solvent to be added can control the extrusion pressure of the resulting paste.

When the organic solvent is added to the slurry, the floating PTFE secondary particles precipitate. Water (supernatant) may be removed to adjust the amount of PTFE secondary particles and the amount of water in the paste. Removing water allows the resulting paste to contain 5% to 50% by mass of water relative to the PTFE secondary particles. The amount of water is still more preferably not less than 10% by mass and not more than 40% by mass.

The production method of the present invention preferably further includes the step of heating the paste to a temperature higher than the boiling point of water but lower than the boiling point of the organic solvent. The production method of the present invention including this step can provide a paste that contains a minimum amount of water. Also, the resulting paste may contain water in an amount of as little as 5% by mass relative to the PTFE secondary particles. The amount of water is still more preferably not more than 2% by mass, particularly preferably not more than 1% by mass. The lower limit thereof is 0% by mass though it is not particularly limited. In the case where the production method of the present invention includes the heating step, the organic solvent preferably has a boiling point higher than that of water.

The production method of the present invention may further includes the step of heating the paste to a temperature not lower than the boiling point of the organic solvent. The production method of the present invention including this step enables adjustment of the extrusion pressure by controlling the amount of the organic solvent to be volatilized, which can be controlled by adjusting the time for heating.

Furthermore, the moldability of the paste can be improved by selecting an organic solvent having an initial boiling point of not lower than 110° C., more preferably not lower than 130° C., and heating a paste in which the organic solvent is added to the secondary particles containing water at a temperature between 100° C. and the initial boiling point of the organic solvent to transpire the water contained, thereby providing a paste containing the secondary particles and the organic solvent (the amount of residual water is not more than 2.0% by mass, preferably not more than 1% by mass).

The production method of the present invention, in order to provide a paste that is less likely to cause defects in molding, preferably does not include the step of drying the paste for reducing the amount of the organic solvent to less than 14% by mass relative to the PTFE secondary particles, and also preferably does not include the step of heating the paste to a temperature not lower than the boiling point of water and not lower than the boiling point of the organic solvent.

The paste produced through such a process contains PTFE secondary particles in an amount of preferably not less than 65% by mass, more preferably not less than 70% by mass, while preferably not more than 86% by mass, more preferably not more than 83% by mass. Too large an amount of PTFE secondary particles may make it difficult to achieve stable molding. Too small an amount of PTFE secondary particles may fail to provide molded articles with sufficient mechanical strength.

The paste of the present invention or a paste produced by the production method of the present invention is molded by extrusion molding, a method generally called paste extrusion molding, to provide a PTFE molded article. In other words, the paste of the present invention and a paste produced by the production method of the present invention may be suitably used as a paste for extrusion molding and may be suitably used as a paste for paste extrusion molding.

The paste may be heated during the extrusion molding. The heating temperature depends on the kind of the resin used. For example, the temperature of the mold of an extruder may be set to 40° C. to 95° C.

After the extrusion molding, the resulting pre-sintered molded article may be sintered. The sintering temperature is preferably higher than the melting point of the PTFE, more preferably 360° C. to 400° C., still more preferably 370° C. to 390° C.

When the PTFE molded article is a porous article, the dispersion is preferably a mixture and the resin other than PTFE is at least one preferably melt-fabricable fluororesin. In this case, the resulting pre-sintered molded article after extrusion molding is preferably sintered within a specific temperature range. The sintering is preferably carried out at a temperature not higher than the melting point of the PTFE and not lower than the melting point of the resin having the lowest melting point among the resins other than PTFE, more preferably at 280° C. to 320° C., still more preferably at 300° C. to 318° C.

By sintering the pre-sintered molded article within a specific temperature range, PTFE, which is not sintered, has a low density and thus remains soft while the resin other than PTFE melts and then solidifies. The resulting molded article accordingly has fine pores and is excellent in mechanical strength, and thus may be formed into a porous molded article, a molded article with a low dielectric constant, a molded article with a low dielectric loss tangent, or the like. Such a molded article may be particularly suitably used as an electric wire, a cable, or a filter. The reason for this is presumably as follows. Sintering within a specific temperature range causes partial melting of the resin other than PTFE. The molten resin therefore enters into gaps between PTFE particles, and the molten resin solidifies after cooling. Thereby, the resulting molded article gains improved mechanical strength while having cavities.

The production method of the present invention enables PTFE to achieve a significantly small thickness. This method allows production of a PTFE molded article with a thickness of not greater than 50 µm, which cannot be accomplished by conventional paste extrusion molding using fine powder. Thus, this method is especially excellent as a method of producing PTFE molded articles such as electric wires, cables, tubes, and filters, which are referred to as slender articles or thin articles.

The above thickness corresponds to any of the film thickness of a PTFE coating material for an electric wire or a cable, the thickness of a PTFE tube, the diameter of a PTFE cylindrical filter, and the thickness of a PTFE tubular filter. In the case of an electric wire or a cable, the thickness may be determined by measuring the diameter thereof with a micrometer, subtracting the diameter of the core wire from the measured diameter, and dividing the obtained value by 2. In the case of a tube, the thickness may be determined by squashing the tube, measuring the thickness of the squashed tube, and dividing the measured value by 2.

The PTFE molded article produced by the production method of the present invention, which has a small thickness of the coating material including PTFE, is particularly suitable for an ultra thin electric wire or cable. When an electric wire or a cable is produced by the production method of the present invention, extrusion molding is performed by passing a core wire through the mandrel of an extruder, followed by drying and sintering. An ultra thin electric wire or cable is useful as an ultra thin coaxial cable, a flat cable, a motor coil wire, or a transformer coil wire. The material for forming the core wire may be any material having a good conductivity, and examples thereof include copper, an alloy of copper, copper-clad aluminum, aluminum, silver, gold, and galvanized iron. The core wire may be a single wire or a stranded wire.

The PTFE molded article produced by the production method of the present invention, which has a small thickness, may be suitably used for applications such as medical tubes, semiconductor tubes, insulation tubes, and heat exchanger tubes. Such a tube may be produced by pulling out the core wire from a molded article including a core wire produced by the production method of producing an electric wire.

In the case where the PTFE molded article produced by the production method of the present invention is a filter, the filter may allow the air to pass therethrough but is less likely to allow water to pass therethrough. Such a filter may be suitably used for applications such as oxygen enrichment membranes and gas-liquid separation membranes.

The molded article of the present invention may be used as a filter by the following methods. In one method, a molded article formed into a tube is used to operate as a filter. An object to be filtered is flowed from the inside of the tube through the outside thereof or in the opposite direction. In another method, a molded article formed into a pole (round pillar shape) is placed in a tube and the pole operates as a filter. An object to be filtered is flowed in the direction parallel to the centerline of the pillar.

Another aspect of the present invention is a coated electric wire including a core wire, and a coating layer covering the core wire, the coating layer being obtainable by the aforementioned paste.

Still another aspect of the present invention is a tube formed from the aforementioned paste.

The use of the aforementioned paste as a paste for extrusion molding or a, paste for paste extrusion molding is one of preferred embodiments of the present invention.

EXAMPLES

The present invention is described with reference to, but not limited to, examples.

The values in the examples were determined by the following methods.

(Solid Concentration of Aqueous Dispersion)

An aqueous dispersion prepared through emulsion polymerization was dried at 250° C. for one hour. The solid concentration of the dispersion was determined from the mass decreased by drying.

(Amount of PTFE Secondary Particles in Paste, Amount of Water in Paste Relative to the PTFE Secondary Particles, and Amount of Organic Solvent in Paste Relative to the PTFE Secondary Particles)

A paste as a sample was heated at 10° C./min to 100° C. with a thermogravimetry and differential thermal analysis (TG-DTA) device, followed by maintaining the temperature for 30 minutes. The sample was then heated at 10° C./rain to 180° C. and the temperature was kept for 30 minutes. The mass decreased between room temperature and 100° C. was determined as the amount of residual water, the mass decreased between 100° C. and 180° C. was determined as the amount of the organic solvent, and the mass of the residue was determined as the amount of PTFE.

(Extrusion Pressure)

The extrusion pressure was measured by the following method in Examples 1 to 3 and Comparative Examples 1 and 2.

Used were a horizontal electric wire paste extruder (inner diameter of cylinder: 50 mm, outer diameter of mandrel: 16 mm, angle of die: 30°, inner diameter of die: 0.77 mm) available from Tabata Machinery Industrial Co., Ltd. and a silver plated wire (diameter: 0.70 mm) as a core wire. A load meter was placed between the pusher ram and the piston serving as an extrusion driving portion, in the extruder. The extrusion force (KN) was measured and the obtained value was divided by the cross-sectional area of the cylinder. The resulting value was determined as the extrusion pressure (MPa).

Example 1

First, 1000 g of an aqueous dispersion of homo-PTFE (standard specific gravity: 2.15) primary particles prepared through emulsion polymerization with a solid concentration of 30% by mass was agitated at 500 rpm with an impeller at a fixed temperature of 25° C. After 11 minutes, the dispersion became highly viscous, slurry-like (porridge-like) matter. After white aggregated particles (PTFE secondary particles) floated in the aqueous phase, 69.0 g (23.0% by mass relative to PTFE) of Isopar E (registered trademark, available from Exxon, initial boiling point: 114° C.) as an organic solvent was added thereto. Further agitation caused coagulated PTFE particles to precipitate in water.

The supernatant water was removed, and the residual water was further removed with a stainless steel mesh (200 mesh). Thereby, a paste containing the PTFE secondary particles was obtained. The resulting paste contained 69.4% by mass of the PTFE secondary particles relative to the paste, 21.0% by mass of water relative to the PTFE secondary particles, and 23.0% by mass of the organic solvent relative to the PTFE secondary particles.

This paste was loaded in a cylinder (φ50 mm) (outer diameter of mandrel: φ16 mm) of a paste extruder (available from Tabata Machinery Industrial Co., Ltd.) and extruded at 1 mm/min using a silver plated wire (φ0.70 mm) as a core wire and a stainless steel mold (inner diameter: 0.77 mm) as a mold. The speed of the core wire was set to 20 m/min. The extrusion pressure was 47 MPa.

The outer diameter of the core wire was 0.70 mm, and the outer diameter of the extruded coating was about 0.78 mm. The organic solvent was dried at 250° C. for five minutes and then the workpiece was sintered at 380° C. for two minutes. Thereby, a coated electric wire having an outer diameter of φ0.75 mm was obtained.

A 200-m coating of the paste extrudate was completed in ten minutes at a stable pressure. The number of defects such as a part without resin and a part where resin concentrated was 12.

Example 2

A paste containing PTFE secondary particles was obtained in the same manner as in Example 1 except that an organic solvent Isopar G (registered trademark, available from Exxon, initial boiling point: 167° C.) was used instead of Isopar E. This paste was placed in an electric furnace at 130° C. for two hours to evaporate water. The resulting paste contained 81.0% by mass of PTFE secondary particles relative to the paste, 0.5% by mass of water relative to the PTFE secondary particles, and 23.0% by mass of the organic solvent relative to the PTFE secondary particles.

This paste was loaded in a cylinder (φ50 mm) (outer diameter of mandrel: 16 mm) of a paste extruder. The paste was extruded at 1 mm/min using a silver plated wire (φ0.70 mm) as a core wire and a stainless steel mold (inner diameter: 0.77 mm) as a mold. The speed of the core wire was set to 20 m/min. The extrusion pressure became stable after five minutes from the beginning of extrusion. The extrusion was carried out at an extrusion pressure of 49 MPa for ten minutes.

A 200-m coating of the paste extrudate was completed in ten minutes at the stable pressure. The number of defects such as a part without resin and a part where resin concentrated was five.

Example 3

A paste containing PTFE secondary particles was obtained in the same manner as in Example 2 except that the amount of the organic solvent Isopar G was changed to 35.0% by mass relative to the PTFE secondary particles. The resulting paste contained 73.9% by mass of PTFE secondary particles relative to the paste, 0.4% by mass of water relative to the PTFE secondary particles, and 35.0% by mass of the organic solvent relative to the PTFE secondary particles.

This paste was loaded in a cylinder (φ50 mm) (outer diameter of mandrel: 16 mm) of a paste extruder. The paste was extruded at 1 mm/min using a silver plated wire (φ0.70 mm) as a core wire and a stainless steel mold (inner diameter: 0.77 mm) as a mold. The speed of the core wire was set to 20 m/min. The extrusion pressure became stable after five minutes from the beginning of extrusion. The extrusion was carried out at an extrusion pressure of 25 MPa for ten minutes.

The outer diameter of the core wire was 0.70 mm and the outer diameter of the extruded coating was about 0.78 mm. The organic solvent was dried at 250° C. for five minutes and then the workpiece was sintered at 380° C. for two minutes. Thereby a coated electric wire with an outer diameter of φ0.75 mm was stably obtained.

A 200-m coating of the paste extrudate was completed in ten minutes at the stable pressure. The number of defects such as a part without resin and a part where resin concentrated was 7.

Comparative Example 1

First, 1000 g of an aqueous dispersion of PTFE primary particles with a solid concentration of 30% by mass prepared through emulsion polymerization was kept at 25° C. and agitated at 500 rpm with an impeller. After 11 minutes, the dispersion became highly viscous, slurry-like (porridge-like) matter. The agitation was terminated when almost all of the aggregated particles floated. Water was removed and the slurry was dried at 150° C. for 24 hours in a dryer to provide powder.

This powder was cooled to room temperature. After 12 hours, Isopar E as an organic solvent in an amount of 23.0% by mass relative to the PTFE secondary particles was mixed with the powder. The resulting paste was subjected to extrusion molding in the same manner as in Example 1.

The paste was not extruded from the mold even though the extrusion pressure of the extruder was raised to as high as 100 MPa.

The paste contained too much an amount of fibrous matter to block the tip of the mold.

Comparative Example 2

First, 1000 g of an aqueous dispersion of PTFE primary particles with a solid concentration of 30% by mass was prepared through emulsion polymerization. To the dispersion were added 69.0 g of Isopar G as an organic solvent and 1.5 g of nitric acid. Continuous agitation provided a resilient aqueous dispersion. Water flowed from the dispersion was removed and the resulting paste was subjected to extrusion molding in the same manner as in Example 1. The extrusion pressure was 5 MPa. The amount of residual water was 52.1% by mass relative to PTFE primary particles.

The paste, however, was difficult to mold stably. The resulting coated electric wire had parts where the core wire was exposed.

A 100-m coating of the paste extrudate was completed in five minutes at an unstable pressure. The number of defects was not less than 100.

Example 4

First, 1000 g of an aqueous dispersion of homo-PTFE (SSG: 2.15) primary particles with a solid concentration of 30% by mass prepared through emulsion polymerization was kept at 25° C. and agitated at 500 rpm with an impeller. After 11 minutes, the dispersion became highly viscous, slurry-like (porridge-like) matter. Then, 75.0 g (25.0% by mass relative to PTFE) of Isopar G (registered trademark, available from Exxon) as an organic solvent was added to the slurry. Further agitation caused coagulated PTFE particles to precipitate in water.

Supernatant water was removed and residual water was further removed with a stainless steel mesh (200 mesh). Thereby a paste containing the PTFE secondary particles was obtained. The resulting paste contained 70.0% by mass of PTFE secondary particles relative to the paste, 8.0% by mass of water relative to the PTFE secondary particles, and 24.3% by mass of the organic solvent relative to the PTFE secondary particles.

This paste was placed in an electric furnace at 150° C. for three hours to evaporate water. The resulting paste contained 80.5% by mass of PTFE secondary particles relative to the paste, 0.5% by mass of water relative to the PTFE secondary particles, and 23.7% by mass of the organic solvent relative to the PTFE secondary particles.

This paste was extruded through a mold at a reduction ratio of 2500 in conformity with ASTM D-4895-10. The extrusion pressure was 11 MPa.

Reference Example 1

First, 428 g of the same paste as obtained in Example 4 was contained in a stainless steel pad (container) and placed in a drying furnace at 250° C. for five hours. Then, the residual water and the organic solvent were transpired to provide 300 g of PTFE secondary particles (including 0.1% by mass of the organic solvent based on the PTFE secondary particles). These PTFE secondary particles were naturally cooled to room temperature. Then, 71.1 g (23.7% by mass relative to the PTFE, which is the same amount as in Example 4) of Isopar G (registered trademark, available from Exxon) was added to the PTFE secondary particles.

The resulting paste was extruded through a mold at a reduction ratio of 2500 in conformity with ASTM D-4895-10 in the same manner as in Example 4. The paste, however, was not extruded even though the pressure was raised to as high as 100 MPa.

Comparative Example 3

First, 1000 g of the same aqueous dispersion (homo-PTFE, SSG: 2.15) as in Example 3 was agitated at 500 rpm with an impeller at a fixed temperature of 25° C. After 11 minutes, the dispersion became highly viscous, slurry-like (porridge-like) matter. The slurry was further agitated to be formed into secondary particles. The secondary particles were dried at 200° C. for 16 hours. Thereby 300 g of PTFE secondary particles were obtained. Thereafter, the secondary particles were naturally cooled to room temperature. Then, 18.6 g (25.0% by mass relative to the PTFE) of Isopar G (registered trademark, available from Exxon) was added to 74.2 g of the secondary particles to provide a paste. The resulting paste was extruded through a mold at a reduction ratio of 200 in conformity with ASTM D-4895-10. The extrusion pressure was 30 MPa. The resulting paste was extruded through a mold at a reduction ratio of 2500 in conformity with ASTM D-4895-10. The paste, however, was not extruded even though the pressure was raised to as high as 100 MPa.

Reference Example 2

First, 92.8 g of the same paste as obtained in Comparative Example 3 was contained in a stainless steel pad (container) and placed in a drying furnace at 250° C. for five hours. Residual water and the organic solvent were transpired to provide 74.2 g of PTFE secondary particles. The PTFE secondary particles were naturally cooled to room temperature. Then, 18.6 g (25.0% by mass relative to PTFE) of Isopar G (registered trademark, available from Exxon) was added to the particles.

This paste was extruded through a mold at a reduction ratio of 200 in conformity with ASTM D-4895-10 in the same manner as in Comparative Example 3. The pressure was 31 MPa.

As shown in the results of Comparative Example 3 and Reference Example 2, the extruded PTFE pastes produced by conventional methods had an extrusion pressure ratio before and after the drying of 0.7 to 1.5 even under drying at 250° C. for five hours. The paste obtained in Comparative Example 3 was regarded as having an extrusion pressure ratio A/B of less than 5 since the extrusion pressure at a reduction ratio of 2500 (namely, extrusion pressure B) was not determined.

TABLE 1

|  |  | Example 1 | Example 2 | Example 3 | Comparative Example 1 | Comparative Example 2 |
|---|---|---|---|---|---|---|
| Paste | PTFE | 300 g | 300 g | 300 g | 300 g | 300 g |
|  | Organic solvent | Isopar E Added after coagulation | Isopar G Added after coagulation | Isopar G Added after coagulation | Isopar E Added after coagulation and drying of water | Isopar G Added along with coagulant before coagulation |
|  |  | 23.0 wt % | 23.0 wt % | 35.0 wt % | 23.0 wt % | 23.0 wt % |
|  | Residual water | 21.0 wt % 63.0 g | After drying water at 130° C. for 2 Hr 0.5 wt % 1.5 g | After drying water at 130° C. for 2 Hr 0.4 wt % 1.2 g | None | 52.1 wt % 156.3 g |
| Drying of organic solvent |  | — | — | — | — | — |
| Molding |  | Metal wire coating φ50/φ16 RR: 22000 | Metal wire coating φ50/φ16 RR: 22000 | Metal wire coating φ50/φ16 RR: 22000 | Metal wire coating φ50/φ16 RR: 22000 | Metal wire coating φ50/φ16 RR: 22000 |
|  | Extrusion pressure | 47 MPa | 49 MPa | 25 MPa | >100 MPa | 5 MPa |
|  | Defects | 12/200 m | 5/200 m | 7/200 m | Incapable of | >100/200 m |

|  |  | Example 4 | Reference Example 1 | Comparative Example 3 | Reference Example 2 |
|---|---|---|---|---|---|
| Paste | PTFE | 300 g | 300 g | 74.2 g | 74.2 g |
|  | Organic solvent | Isopar G Added during coagulation (to slurry) | Isopar G Added during coagulation (to slurry) | Isopar G Added after coagulation and drying of water | Isopar G Re-added after coagulation and drying of water and organic solvent |
|  |  | 25.0 wt % | 25.0 wt % | 25.0 wt % | 25.0 wt % |
|  | Residual water | After drying water at 150° C. for 3 Hr 0.5 wt % | After drying water at 150° C. for 3 Hr 0.5 wt % | None | None |
| Drying of organic solvent |  | — | Drying organic solvent at 250° C. for 5 Hr | — | Drying organic solvent at 250° C. for 5 Hr |
|  |  | Residual solvent Isopar G 23.7 wt % | Isopar G 23.7 wt % re-added |  | Isopar G 25 wt % re-added |
| Molding |  | ASTM D4895-10 φ25.4 mm RR: 2500 | ASTM D4895-10 φ25.4 mm RR: 2500 | ASTM D4895-10 φ25.4 mm RR: 200 | ASTM D4895-10 φ25.4 mm RR: 200 |
|  | Extrusion pressure | 11 MPa | >100 MPa | 30 MPa | 31 MPa |
|  | Defects | Favorable | Incapable of | Favorable | Favorable |

The invention claimed is:

1. A paste (A) comprising secondary particles of polytetrafluoroethylene in an amount of 65% to 86% by mass and an organic solvent in an amount of 14% to 35% by mass relative to PTFE secondary particles,
   wherein the PTFE secondary particles have an average particle size of not smaller than 50 μm and not greater than 2 mm,
   the paste (A) has an extrusion pressure at a reduction ratio of 2500 of 10 to 60 MPa, and
   the paste (A) satisfies a ratio A/B of not lower than 9,
   wherein A is an extrusion pressure of a paste obtained by sintering the paste (A) at 250° C. for five hours to provide dry particles and adding the same organic solvent as contained in the paste (A) in the same mass as contained in the paste (A) to the dry particles, and B is an extrusion pressure of the paste (A) at a reduction ratio of 2500.

2. A coated electric wire comprising:
   a core wire, and
   a coating layer covering the core wire,
   the coating layer being obtained by extrusion molding of the paste (A) according to claim 1.

3. A tube obtained by extrusion molding of the paste (A) according to claim 1.

4. A method of producing the paste (A) according to claim 1, comprising the steps of:
   coagulating primary particles of polytetrafluoroethylene in an aqueous dispersion that contains the primary particles and water to form slurry that contains secondary particles of polytetrafluoroethylene and water or secondary particles of polytetrafluoroethylene floating in water; and
   adding an organic solvent to at least one of the slurry and the secondary particles of polytetrafluoroethylene floating in water to provide the paste.

5. The production method according to claim 4,
   wherein the slurry contains not less than 60% by mass of water relative to the secondary particles.

6. The production method according to claim 4,
   wherein 14% to 35% by mass of the organic solvent is added relative to the secondary particles of polytetrafluoroethylene.

7. The production method according to claim 4, wherein the paste contains 14% to 35% by mass of the organic solvent relative to the secondary particles of polytetrafluoroethylene.

8. The production method according to claim 4, wherein the paste contains 5% to 50% by mass of water relative to the secondary particles of polytetrafluoroethylene.

9. The production method according to claim 4, further comprising the step of heating the paste to a temperature higher than the boiling point of water and lower than the boiling point of the organic solvent, the organic solvent having a boiling point higher than the boiling point of water.

10. The production method according to claim 9, wherein the paste contains not more than 2.0% by mass of water relative to the secondary particles of polytetrafluoroethylene.

\* \* \* \* \*